US009496957B2

(12) United States Patent
Su et al.

(10) Patent No.: US 9,496,957 B2
(45) Date of Patent: Nov. 15, 2016

(54) METHOD AND APPARATUS FOR ALLOCATING OPTICAL SPECTRUM BANDWIDTH RESOURCES (71) Applicant: Huawei Technologies Co., Ltd., Shenzhen, Guangdong (CN)

(72) Inventors: Wei Su, Amsterdam (NL); Chiwu Ding, Chengdu (CN);
(Continued)

(73) Assignee: Huawei Technologies Co., Ltd., Shenzhen (CN)

( * ) Notice: Subject to any disclaimer, the term of this patent is extended or adjusted under 35 U.S.C. 154(b) by 35 days.

(21) Appl. No.: 14/573,486

(22) Filed: Dec. 17, 2014

(65) Prior Publication Data
US 2015/0104178 A1 Apr. 16, 2015

Related U.S. Application Data (63) Continuation of application No. PCT/CN2012/077176, filed on Jun. 19, 2012.

(51) Int. Cl.
H04B 10/27 (2013.01)
H04J 3/16 (2006.01)
H04L 27/26 (2006.01)

(52) U.S. Cl.
CPC .......... H04B 10/27 (2013.01); H04J 3/1652 (2013.01); H04J 3/1694 (2013.01); H04L 27/2601 (2013.01); H04Q 2213/1301 (2013.01)

(58) Field of Classification Search
USPC .......................................... 398/79
See application file for complete search history.

(56) References Cited

U.S. PATENT DOCUMENTS

2010/0142947 A1* 6/2010 Shin ............... H04J 3/1652
398/43
2010/0232785 A1 9/2010 Gazier et al.
(Continued)

FOREIGN PATENT DOCUMENTS

CN 101291179 A 10/2008
CN 101841741 A 9/2010
CN 102349310 A 2/2012

OTHER PUBLICATIONS

Masahiko Jinno, Hidehiko Takara, Bartlomiej Kozicki, Yukio Tsukishima, Yoshiaki Sone, and Shinji Matsuoka, NTT Corporation, Spectrum-Efficient and Scalable Elastic Optical Path Network: Architecture, Benefits, and Enabling Technologies, IEEE Communications Magazine—Nov. 2009, pp. 68-71.*

(Continued)

Primary Examiner — David Payne
Assistant Examiner — Omar S Ismail
(74) Attorney, Agent, or Firm — Leydig, Voit & Mayer, Ltd.

(57) ABSTRACT

Embodiments of the present invention provide a method and an apparatus for allocating optical spectrum bandwidth resources. The method includes: first determine bandwidth of an OTUbase according to optical-layer frequency grid bandwidth and carrier spectrum efficiency; then construct an HO OTUflex according to bandwidth of customer service data and the bandwidth of the OTUbase, bandwidth of the HO OTUflex is a first integer multiple of the bandwidth of the OTUbase; map the customer service data into a payload area of the HO OTUflex and encapsulate overhead information; at last, modulate the HO OTUflex that carries the customer service data to a second integer number of optical channel carriers. The embodiments of the present invention (Continued)

apply to a scenario where customer service data is transported.

15 Claims, 8 Drawing Sheets

(72) Inventors: Qiuyou Wu, Shenzhen (CN); Huaping Qing, Chengdu (CN); Yao Shen, Shenzhen (CN); Hongli Jiang, Chengdu (CN); Jianying Wei, Chengdu (CN)

(56) References Cited

U.S. PATENT DOCUMENTS

| | | |
|---|---|---|
| 2012/0002671 A1 | 1/2012 | Xiao et al. |
| 2013/0121700 A1* | 5/2013 | Dong .................. H04L 27/2697 398/79 |
| 2013/0259476 A1* | 10/2013 | Shinohara ............. H04J 3/1652 398/52 |
| 2013/0259484 A1* | 10/2013 | Kawahara ............... H04J 14/08 398/98 |
| 2014/0161462 A1 | 6/2014 | Cao |
| 2014/0334503 A1 | 11/2014 | Dong et al. |

OTHER PUBLICATIONS

Ohara et al., "OTN Technology for Multi-flow Optical Transponder in Elastic 400G/1T Transmission Era," OFC/NFOEC Technical Digest (2012).

"Series G: Transmission Systems and Media, Digital Systems and Networks; Digital Terminal Equipments—General; Series Y: Global Information Infrastructure, Internet Protocol Aspects and Next-Generation Networks; Internet Protocol Aspects—Transport; Interfaces for the Optical Transport Network," Telecommunication Standardization Sector of ITU, Recommendation ITU-T G.709/Y.1331, International Telecommunications Union (Feb. 2012).

Jinno et al., "Introducing Elasticity and Adaptation Into the Optical Domain Toward More Efficient and Scalable Optical Transport Networks," 2010 ITU-T Kaleidoscope: Beyond the Internet? Innovations for Future Networks and Services, pp. 1-7, Institute of Electrical and Electronics Engineers, New York, New York (Dec. 13-15, 2010).

"Series G: Transmission Systems and Media, Digital Systems and Networks; Data Over Transport—Generic Aspects—General; Series Y: Global Information Infrastructure, Internet Protocol Aspects and Next-Generation Networks; Internet Protocol Aspects—Transport Link Capacity Adjustment Scheme (LCAS) for Virtual Concatenated Signals," Telecommunication Standardization Sector of ITU, ITU-T Recommendation G.7042/Y.1305, International Telecommunications Union (Mar. 2006).

"Series G: Transmission Systems and Media, Digital Systems and Networks Digital Terminal Equipments—General Series Y: Global Information Infrastructure, Internet Protocol Aspects and Next-Generation Networks Internet Protocol Aspects—Transport Interfaces for the Optical Transport Network(OTN)," Telecommunication Standardization Sector of ITU, Recommendation ITU-T G.709/Y.1331, International Telecommunications Union (Dec. 2009).

* cited by examiner

METHOD AND APPARATUS FOR ALLOCATING OPTICAL SPECTRUM BANDWIDTH RESOURCES

CROSS-REFERENCE TO RELATED APPLICATIONS

This application is a continuation of International Patent Application No. PCT/CN2012/077176, filed on Jun. 19, 2012, which is hereby incorporated by reference in its entirety.

TECHNICAL FIELD

The present invention relates to the field of communications, and in particular, to a method and an apparatus for allocating optical spectrum bandwidth resources.

BACKGROUND

Optical transport network (OTN) is a core technology of a next generation transport network. The OTN includes electrical-layer and optical-layer technical specifications and achieves flexible scheduling and management of large-capacity services. With the rapid growth of customer services, optical transmission technologies at a 100 Gbit/s rate have been widely applied. Currently, in order to achieve optimum and most efficient network configuration and effective utilization of optical spectrum resources, the OTN is required to provide capabilities in adaptively allocating optical spectrum resources and adjusting bandwidth, which lead to hitless bandwidth adjustment. For example, when allocation of the optical spectrum resources is appropriately changed by flexibly selecting parameters such as an optical modulation mode based on service traffic volume and a transmission distance, the OTN is required to adapt to the change through bandwidth adjustment.

Figure 1:
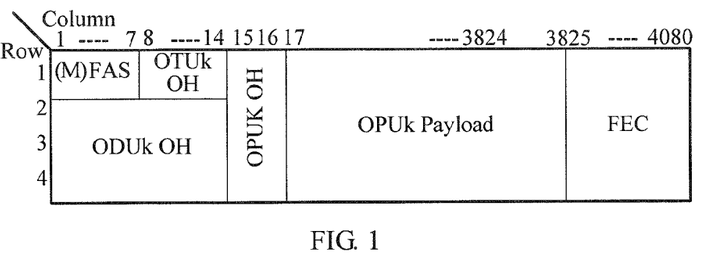
FIG. 1 is a schematic diagram of an frame format of an OTN in the prior art.

The current OTN provides an OPUk, an ODUk, and an OTUk at a plurality of rates. A coefficient k indicates bit rates and different types that are supported for the OPUk, ODUk, and OTUk. To be specific, k=0 indicates a bit rate of 1.25 Gbit/s; k=1 indicates a bit rate of 2.5 Gbit/s; k=2 indicates a bit rate of 10 Gbit/s; k=3 indicates a bit rate of 40 Gbit/s; k=4 indicates a bit rate of 100 Gbit/s; k=flex indicates an arbitrary bit rate. Meanwhile, the OTN contains concepts of lower order and higher order. As shown in FIG. 1, the frame format of the OTN is a 4080*4 modular structure, including a frame alignment byte FAS that provides a frame synchronization alignment function, and an optical channel transport unit overhead byte OTUk OH that provides a network management function at an optical channel transport unit level. The ODUk OH is an optical channel data unit overhead byte that provides a maintenance and operation function. The OPUk OH is an optical channel payload unit overhead byte that provides a customer signal adaption function. The OPUk is an optical channel payload unit that provides a customer signal bearer function. FEC is a forward error correction byte that provides an error detection and correction function.

In the prior art, the current OTN may use an Lower order Optical Channel Data Unit-x (LO ODUx) to adapt customer service data by implementing mapping and encapsulation for customer service data, map the LO ODUx into an Higher order Optical Channel Data Unit-k (HO ODUk), and encapsulate the HO ODUk into an higher order optical channel transmission unit-k (HO OTUk), which is used for adapting optical spectrum resource allocation and achieving bearing and transport. The LO ODUx may include an ODU0, an ODD1, an ODU2, an ODU3, and an ODUflex. The HO ODUk includes an ODU1, an ODU2, an ODU3, and an ODU4 that have fixed rate levels. The OTN uses modes with fixed rate levels such as OTD1 (2.5G), OTU2 (10G), OTU3 (40G), and OTU4 (100G) to adapt optical-layer spectrum bandwidth resources and achieve transport; besides, the modes OTU1 (2.5G), OTU2 (10G), OTU3 (40G), and OTU4 (100G) each occupies one optical spectrum bandwidth resource that is equally spaced at 50 GHz intervals.

When a change occurs in the optical spectrum bandwidth resources allocated for the OTUk with fixed rate levels, the rates of the OTUk need to change to adapt to the change. However, the current OTN uses fixed rate levels to adapt optical spectrum bandwidth resources, and therefore, cannot flexibly adapt to a change in optical spectrum bandwidth resource allocation, which leads to inefficient utilization of optical spectrum resources. Besides, a 2.5G OTU1 or a 10G OTU2 always occupies 50 GHz optical spectrum bandwidth resources, which leads to waste and inefficient utilization of optical spectrum bandwidth resources.

SUMMARY

Embodiments of the present invention provide a method and an apparatus for allocating optical spectrum bandwidth resources, which allocate transmission bandwidth HO OTU that suits bandwidth of customer service data and optical spectrum bandwidth resources according to the bandwidth of the customer service data, thereby achieving flexible allocation and efficient utilization of optical spectrum resources.

An embodiment of the present invention provides a method for allocating optical spectrum bandwidth resources. The method includes:

obtaining bandwidth of a base optical channel transmission unit OTUbase according to optical-layer frequency grid bandwidth and carrier spectrum efficiency;

constructing a bandwidth-adjustable higher order optical channel transmission unit HO OTUflex according to bandwidth of customer service data and the bandwidth of the OTUbase, where bandwidth of the HO OTUflex is a first integer multiple of the bandwidth of the OTUbase and the first integer is not less than 1;

mapping the customer service data to a payload area of the HO OTUflex and encapsulating overhead information;

modulating the HO OTUflex that carries the customer service data to a second integer number of optical channel carriers, where the second integer is not less than 1.

Another embodiment of the present invention provides an apparatus for allocating optical spectrum bandwidth resources. The apparatus includes:

a first obtaining unit, configured to obtain bandwidth of a base optical channel transmission unit OTUbase according to optical-layer frequency grid bandwidth and carrier spectrum efficiency;

a constructing unit, configured to construct a bandwidth-adjustable higher order optical channel transmission unit HO OTUflex according to bandwidth of customer service data and the bandwidth of the OTUbase, where bandwidth of the HO OTUflex is a first integer multiple of the bandwidth of the OTUbase and the first integer is not less than 1;

a first mapping and encapsulation unit, configured to map the customer service data to a payload area of the HO OTUflex and encapsulate overhead information;

a modulating unit, configured to modulate the HO OTUflex that carries the customer service data to a second integer number of optical channel carriers, where the second integer is not less than 1.

The embodiments of the present invention provide a method and an apparatus for allocating optical spectrum bandwidth resources, where bandwidth of an OTUbase is first obtained according to optical-layer frequency grid bandwidth, then an HO OTUflex whose bandwidth is a first integer multiple of the bandwidth of the OTUbase is constructed according to bandwidth of customer service data and the bandwidth of the OTUbase, the customer service data is mapped to a payload area of the HO OTUflex, related overhead information is encapsulated in the HO OTUflex, and the HO OTUflex is modulated to a second integer number of optical channel carriers for transport. Because the bandwidth of the OTUbase is constructed according to the optical-layer frequency grid bandwidth and therefore fully matches the optical-layer frequency grid bandwidth, and because the HO OTUflex is constructed according to the bandwidth of customer service data and the bandwidth of the OTUbase, a transport bandwidth HO OTU that suits the customer service data and optical spectrum bandwidth resources can be allocated according to the bandwidth of the customer service data, thereby achieving flexible allocation and efficient utilization of optical spectrum resources.

BRIEF DESCRIPTION OF DRAWINGS

To describe technical solutions in embodiments of the present invention or in the prior art more clearly, the following briefly introduces the accompanying drawings required for describing the embodiments or the prior art. Apparently, the accompanying drawings in the following descriptions show merely some embodiments of the present invention, and persons of ordinary skill in the art may still derive other drawings from the accompanying drawings without creative efforts.

DESCRIPTION OF EMBODIMENTS

The following embodiments are exemplary embodiments of the present invention only and are not intended to limit the protection scope of the invention. It would be apparent to persons skilled in the art that various modifications and variations may be made to these embodiments without departing from the scope of the invention. The invention is intended to cover such modifications and variations provided that they fall in the scope of protection defined by the following claims.

Figure 2:
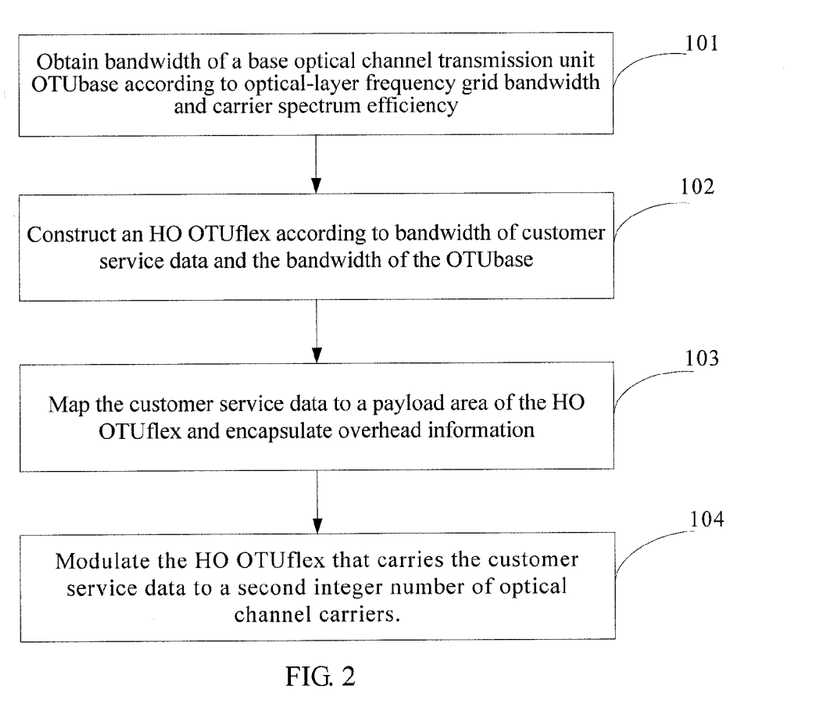
FIG. 2 is a schematic flow chart of a method for allocating optical spectrum bandwidth resources according to an embodiment of the present invention.

An embodiment of the present invention provides a method for allocating optical spectrum bandwidth resources, as shown in FIG. 2, including:

Step 101: Obtain bandwidth of a base optical channel transmission unit OTUbase according to optical-layer frequency grid bandwidth and carrier spectrum efficiency.

Specifically, a following formula is used: bandwidth of an OTUbase=FG*carrier spectrum efficiency/m, where Frequency Grid (FG) represents optical-layer frequency grid bandwidth whose value can be determined according to a definition of optical frequency grid in International Telecommunications Union ITU-T G. 694. 1; m represents a multiple between bandwidth of an OTUbase and a product of the optical-layer frequency grid bandwidth and the carrier spectrum efficiency that is set according to requirements, and m is an integer not less than 1. Optionally, the carried carrier is an orthogonal frequency division multiplexing carrier with a plurality of subcarriers. At this time, the bandwidth of the OTUbase is calculated by applying a formula: bandwidth of an OTUbase=FG*spectrum efficiency of an orthogonal frequency division multiplexing subcarrier/m.

For example, if FG=12.5 GH, spectrum efficiency of the orthogonal frequency division multiplexing subcarrier is 2 bit/Hz/s, and m=1, the bandwidth of the OTUbase will be 12.3 GH*2 bit/Hz/s=25 Gbit/s.

It should be noted that, no matter whether a plurality of carriers or a single carrier is used for transport, the carrier spectrum efficiency in the preceding formula may be changed as required to obtain the bandwidth of the OTUbase, and the present invention does not limit a modulation format adopted by a carrier.

It should be noted that a base optical channel transmission unit OTUbase is an optical channel transmission unit with the minimum bandwidth at an optical layer and bandwidth of an OTUbase provides basis for determining bandwidth of another optical channel transmission unit.

Step 102: Construct a bandwidth-adjustable higher order optical channel transmission unit HO OTUflex according to bandwidth of customer service data and the bandwidth of the OTUbase.

Bandwidth of the HO OTUflex is a first integer multiple of the bandwidth of the OTUbase and the first integer is not less than 1.

Specifically, according to the bandwidth of customer service data and the bandwidth of the OTUbase, it may be known that the bandwidth of customer service data is a multiple of the bandwidth of the OTUbase. The multiple is represented by k, where k is larger than 0 and, by applying a ceiling function to k, a first integer can be obtained, where the first integer is represented by p; an HO OTUflex is constructed, where bandwidth of the HO OTUflex is p times the bandwidth of the OTUbase.

Further, an HO OTUflex has two frame formats, where one is a concatenation structure of the first integer number of OTUbase frames and the other frame format of the HO OTUflex is the same as a frame format of the OTUbase.

Figure 3:
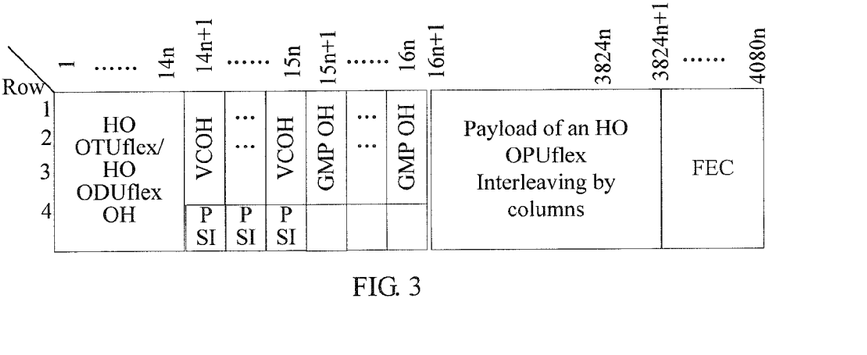
FIG. 3 is a schematic diagram of a frame format of an HO OTUflex according to an embodiment of the present invention.

Specifically and preferably, a frame format of an OTUbase is the same as a frame format of an OTN. If a frame format of an HO OTUflex is a concatenation structure of an OTUbase frame, the frame format of the HO OTUflex is a 4080n*4 modular structure, where n represents a number of OTUbase frames, as shown in FIG. 3.

If a frame format of an HO OTUflex is the same as a frame format of the OTUbase, the frame format of the HO OTUflex is the same as a frame format of an OTN, and for details, reference may be made to FIG. 1.

It should be noted that a frame format of an OTUbase may be different from a frame format of an OTN, but be another frame format, which is not limited by the present invention.

Step 103: Map the customer service data to a payload area of the HO OTUflex and encapsulate overhead information.

Specifically, a method for mapping the customer service data to a payload area of the HO OTUflex varies with bandwidth of the customer service data.

Figure 4:
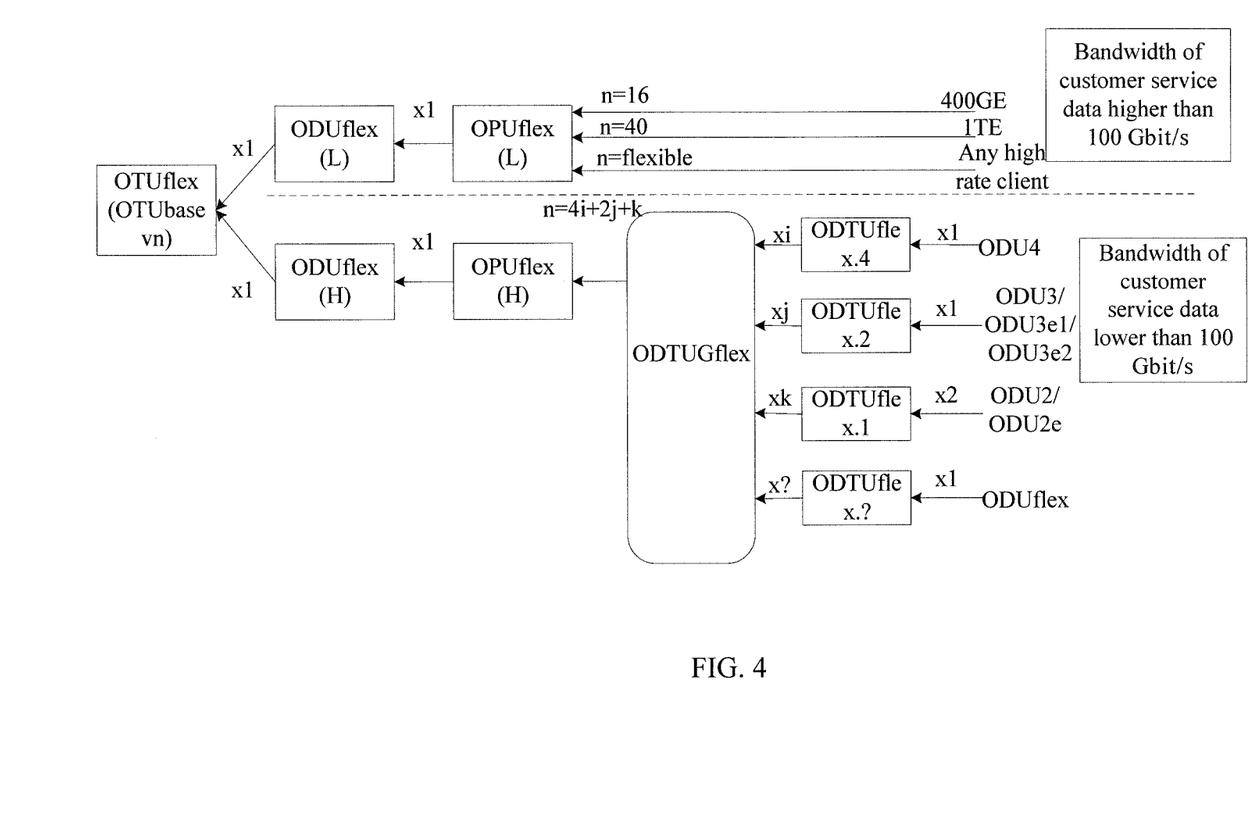
FIG. 4 is a schematic diagram of mapping customer service data to a payload area of an HO OTUflex according to an embodiment of the present invention.

In a first method, as shown in FIG. 4, when the bandwidth of the customer service data exceeds a threshold, the customer service data is directly mapped to a payload area of an OPUflex (Optical Channel Payload Unit flex, bandwidth-adjustable optical channel payload unit), and the OPUflex is mapped to a corresponding ODUflex (Optical Channel Data Unit flex, bandwidth-adjustable optical channel data unit) after related overhead information is encapsulated, and the ODUflex is mapped to an HO OTUflex after related overhead information is encapsulated. Preferably, the customer service data is directly mapped to an OPUflex through a generic mapping procedure.

It should be noted that a threshold is pre-set by a system and, in FIG. 4, the threshold exemplarily takes a value of 100 Gbit/s.

It should be noted that the method for directly mapping the customer service data to an OPUflex may further be a bit asynchronization generic procedure or another method, and the present invention does not limit the method for directly mapping the customer service data to an OPUflex.

In a second method, refer to FIG. 4, when bandwidth of customer service data is less than the threshold, first the customer service data is mapped to a payload area of an Lower order Optical Channel Data Unit-x (LO ODUx), the LO ODUx is mapped to a payload area of an Higher order Optical Channel Payload Unit-flex (HO OPUflex) after related overhead information is encapsulated, the HO OPUflex is mapped to an Higher order Optical Channel Data Unit-flex (HO ODUflex) after related overhead information is encapsulated, and finally the HO ODUflex is mapped to an HO OTUflex after related overhead information is encapsulated. An LO ODUx includes an ODU0, an ODU1, an ODU2, an ODU2e, an ODU3, an ODU3e1, an ODU3e2, an ODU4, and an ODUflex. A different value of x indicates a different fixed rate of an LO ODU and a different type of the LO ODU. Preferably, the customer service data is directly mapped to an LO ODUx through a generic mapping procedure.

It should be noted that the method for directly mapping the customer service data to an LO ODUx may further be a bit asynchronization generic procedure or another manner, and the present invention does not limit the manner for directly mapping the customer service data to an LO ODUx.

Figure 5:
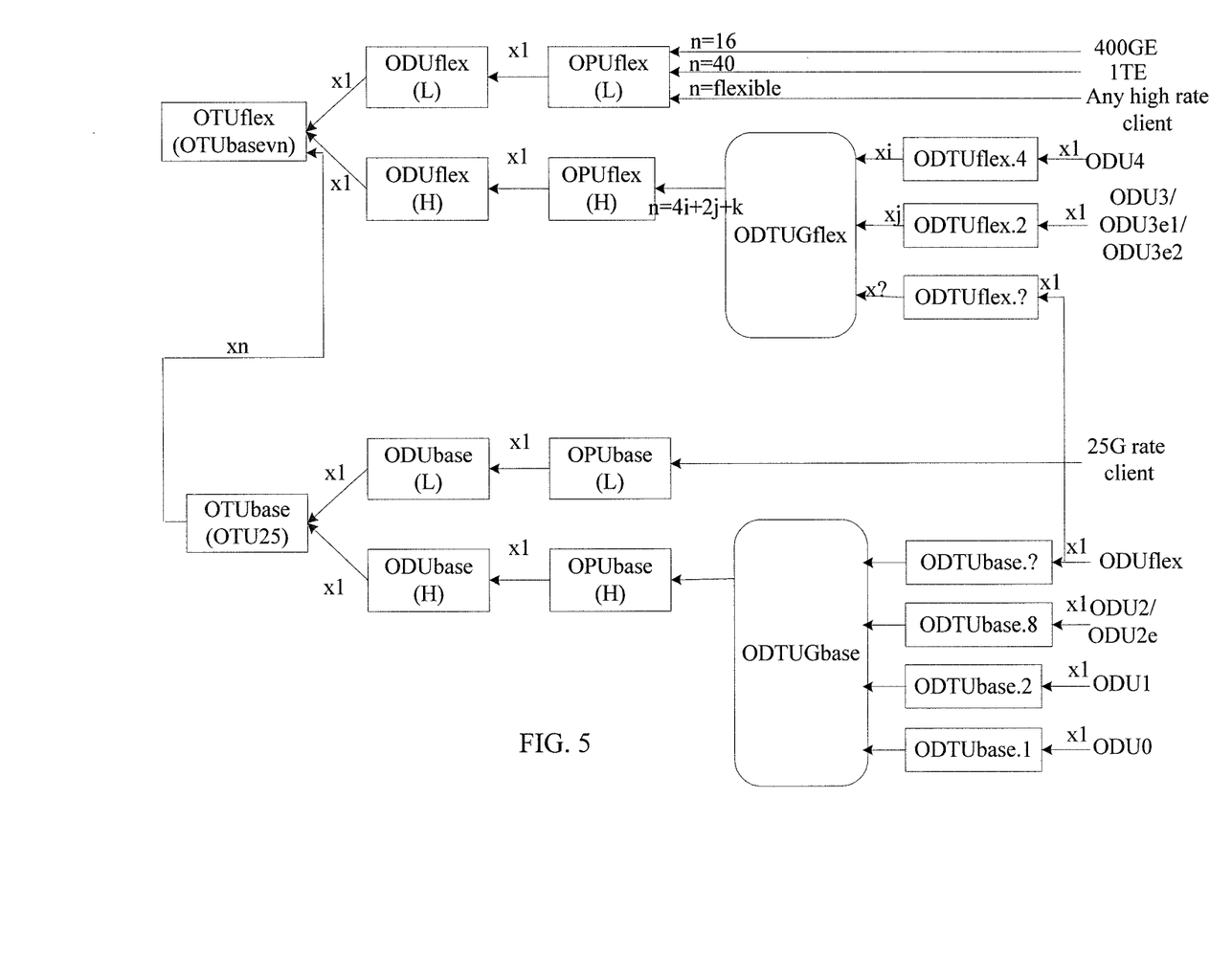
FIG. 5 is another schematic diagram of mapping customer service data to a payload area of an HO OTUflex according to an embodiment of the present invention.

A third method involves three situations that are identified by comparing bandwidth of an OTUbase with the customer service data whose bandwidth is less than the threshold as described in the second method, as shown in FIG. 5.

A first situation is, when the bandwidth of the customer service data is less than the threshold but higher than the bandwidth of the OTUbase, the customer service data is mapped to a payload area of an HO OTUflex by using a same method as the second method, and no details are provided herein.

A second situation is, when the bandwidth of the customer service data is lower than the bandwidth of the OTUbase, the customer service data is mapped to a payload area of an LO ODUx, the LO ODUx is mapped to a payload area of an Higher order Optical Channel Payload Unit base (HO OPUbase) after related overhead information is encapsulated, the HO OPUbase is mapped to an Higher order Optical Channel Data Unit base (HO ODUbase) after related overhead information is encapsulated, the HO ODUbase is mapped to an OTUbase after related overhead information is encapsulated, and finally the OTUbase is mapped to a payload area of an OTUflex. Preferably, the customer service data is directly mapped to an LO ODUx through a generic mapping procedure.

It should be noted that the manner for directly mapping the customer service data to an LO ODUx may further be a bit asynchronization generic procedure or another manner, and the present invention does not limit the manner for directly mapping the customer service data to an LO ODUx.

A third situation is, when the bandwidth of the customer service data equals the bandwidth of the OTUbase, the customer service data is directly mapped to a payload area of an OPUbase, the OPUbase is mapped to an ODUbase after related overhead information is encapsulated, the ODUbase is mapped to an OTUbase after related overhead information is encapsulated, and the OTUbase is mapped to a payload area of an HO OTUflex. Preferably, the customer service data is directly mapped to an OPUbase through a generic mapping procedure.

It should be noted that, in FIG. 5, the bandwidth 25 Gbit/s of an OTUbase is taken as an example for illustration.

It should be noted that the manner for directly mapping the customer service data to an OPUbase may further be a bit asynchronization generic procedure or another manner, and the present invention does not limit the manner for directly mapping the customer service data to an OPUbase.

It should be noted that, when the bandwidth of the customer service data is lower than the threshold, the method for mapping the customer service data to a payload area of an HO OTUbase may further be another method, and the present invention does not limit the method.

It should be noted that lower order and higher order are relative. Exemplarily, an ODU that directly adapts the customer service data is a first level ODU, and a high-bandwidth ODU into which a low-bandwidth ODU is multiplexed is a second level ODU; generally, a first level ODU is called an LO ODU and a second level ODU is called an HO ODU.

It should be noted that an OPUbase and an ODUbase correspond to an OTUbase, where rates of the OPUbase and the ODUbase depend on the rate of the OTUbase. Optionally, the rate of an OPUbase=the rate of an OTUbase*238/255, the rate of an ODUbase=the rate of an OTUbase*239/255.

Step 104: Modulate the HO OTUflex that carries the customer service data to a second integer number of optical channel carriers, where the second integer is not less than 1.

Specifically, the HO OTUflex that carries the customer service data is divided into a third integer number of OTUbase channels that is modulated to the second integer number of optical channel carriers and transmit the customer service data through the second integer number of optical channel carriers, where the third integer is not less than 1 and the third integer is a multiple of the second integer.

Exemplarily, an HO OTUflex that carries the customer service data is divided into 16 OTUbase channels and the 16 OTUbase channels are modulated to four optical channel carriers, that is, every four OTUbase channels are multiplexed into one optical channel carrier and the customer service data is transmitted through the four optical channel carriers.

It should be noted that each of the 16 parts obtained by dividing the HO OTUflex is called an OTUbase channel.

Preferably, the second integer equals the third integer; further preferably, the third integer equals the first integer.

It should be noted that, when the second integer and the third integer are integers greater than 1, multiplexing and modulating the third integer number of OTUbase channels to the second integer number of optical channel carriers achieves transmission of the customer service data through a plurality of carriers.

Further, depending on different frame formats of an HO OTUflex, methods vary for dividing the HO OTUflex that carries the customer service data into the third integer number of OTUbase channels.

Specifically, if a frame format of an HO OTUflex is a concatenation structure of an OTUbase frame, a method for dividing the HO OTUflex that carries the customer service data into the third integer number of OTUbase channels includes:

dividing the HO OTUflex that carries the customer service data into the third integer number of OTUbase channels by columns.

It should be noted that here a column is a complete OTUbase frame, that is, the HO OTUflex is divided into the first integer number of OTUbase frames and each OTUbase frame corresponds to one OTUbase channel.

If a frame format of the HO OTUflex is the same as a frame format of the OTUbase, a method for dividing the HO OTUflex into the third integer number of OTUbase channels includes:

dividing the HO OTUflex into the third integer number of OTUbase channels by byte granularities.

Exemplarily, four bytes are taken as a division granularity and a frame of the HO OTUflex may be divided by granularities of four bytes into the third integer number of OTUbase channels.

It should be noted that, when the HO OTUflex is divided by byte granularities, a frame of the OTUflex is divided in an order from left to right and from up to down.

Alternatively, the HO OTUflex is distributed by frame granularities to the third integer number of OTUbase channels.

An embodiment of the present invention provides a method for allocating optical spectrum bandwidth resources, where bandwidth of an OTUbase is first obtained according to optical-layer frequency grid bandwidth, then an HO OTUflex whose bandwidth is a first integer multiple of the bandwidth of the OTUbase is constructed according to bandwidth of customer service data and the bandwidth of the OTUbase, the customer service data is mapped to a payload area of the HO OTUflex, related overhead information is encapsulated in the HO OTUflex, and the HO OTUflex is modulated to a second integer number of optical channel carriers for transport. Because the bandwidth of the OTUbase is constructed according to the optical-layer frequency grid bandwidth and therefore fully matches the optical-layer frequency grid bandwidth, and because the HO OTUflex is constructed according to the bandwidth of customer service data and the bandwidth of the OTUbase, a transport bandwidth HO OTU that suits the customer service data and optical spectrum bandwidth resources can be allocated according to the bandwidth of the customer service data, thereby achieving flexible allocation and efficient utilization of optical spectrum resources.

Figure 6:
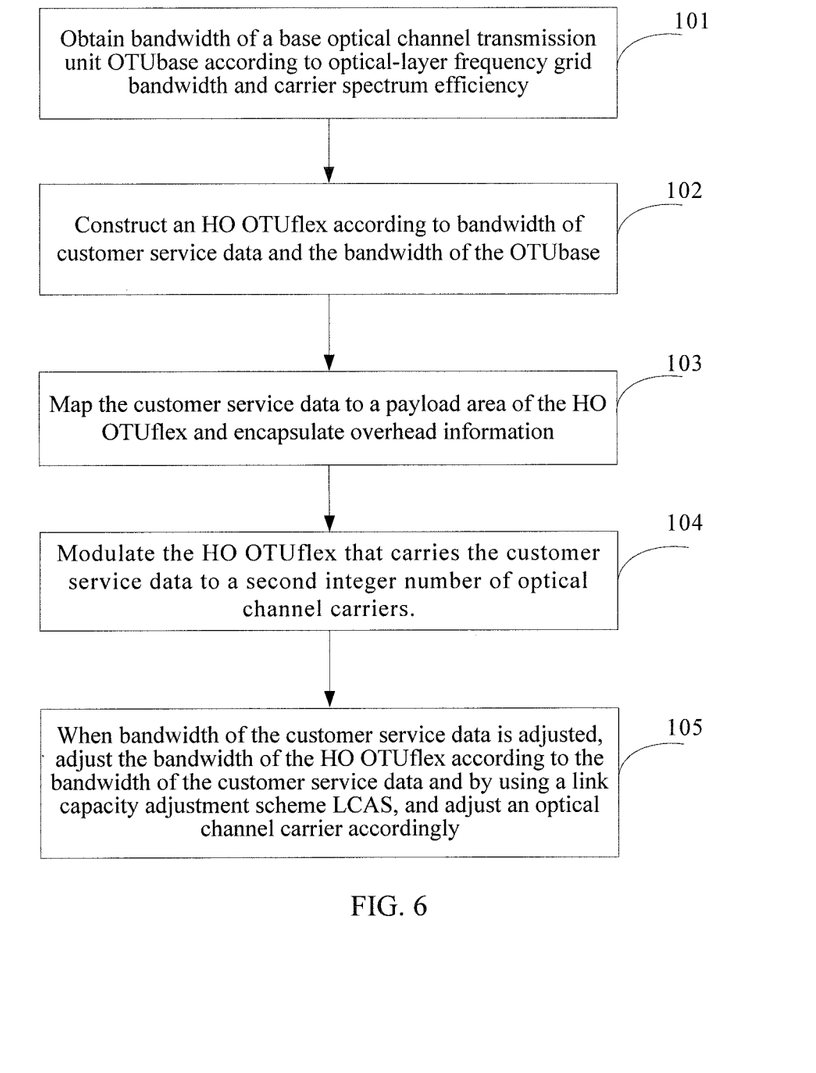
FIG. 6 is a schematic flow chart of another method for allocating optical spectrum bandwidth resources according to an embodiment of the present invention.

The above method, as shown in FIG. 6, further includes:

Step 105: When bandwidth of the customer service data is adjusted, adjust the bandwidth of the HO OTUflex according to the bandwidth of the customer service data and by using a link capacity adjustment scheme LCAS, and adjust an optical channel carrier accordingly.

A control field of the LCAS includes a setting instruction; the setting instruction is used for instructing a destination end, in a next frame of the HO OTUflex, to implement a switchover of mapping the customer service data to a payload area of an HO OTUflex after a change in bandwidth. Preferably, a binary code of the setting instruction is 0100.

If the bandwidth of the customer service data increases, a fourth integer number of optical channel carriers are added in each section of a link and the LCAS is used to add a fifth integer number of OTUbase channels, the fifth integer number of OTUbase channels are added to the HO OTUflex, and the added fifth integer number of OTUbase channels are modulated to the added fourth integer number of optical channel carriers, where the fourth integer is not less than 1 and the fifth integer is an integral multiple of the fourth integer.

Specifically, first the fifth integer number of OTUbase channels that need to be added at a source end and a destination end is determined, that is, the value of the fifth integer is determined. In each section of a link, the fourth integer number of optical channel carriers whose modulation format is the same as that of an established optical channel carrier between the source end and the destination end are added, and the added optical channel carriers are made available selectively. The LCAS is used to add the fifth integer number of OTUbase channels on the source end and the destination end, the fifth integer number of OTUbase channels is combined to the HO OTUflex, the added fifth integer number of OTUbase channels is modulated to the added fourth integer number of optical channel carriers, where the number of setting instructions sent to the destination end is larger than or equal to 1 and smaller than the fifth integer, that is, a setting instruction is sent to at least one added member at the destination end.

It should be noted that there are a plurality of intermediate nodes between the source end and the destination end and a link between every two neighbor nodes is a section of link. The intermediate nodes provide a transport channel for transport of the HO OTUflex. When an OTUbase channel is added at the source end and the destination end, the intermediate nodes allocate an idle optical channel carrier for the added OTUbase channel to achieve transport of the added OTUbase channel.

Figure 7:
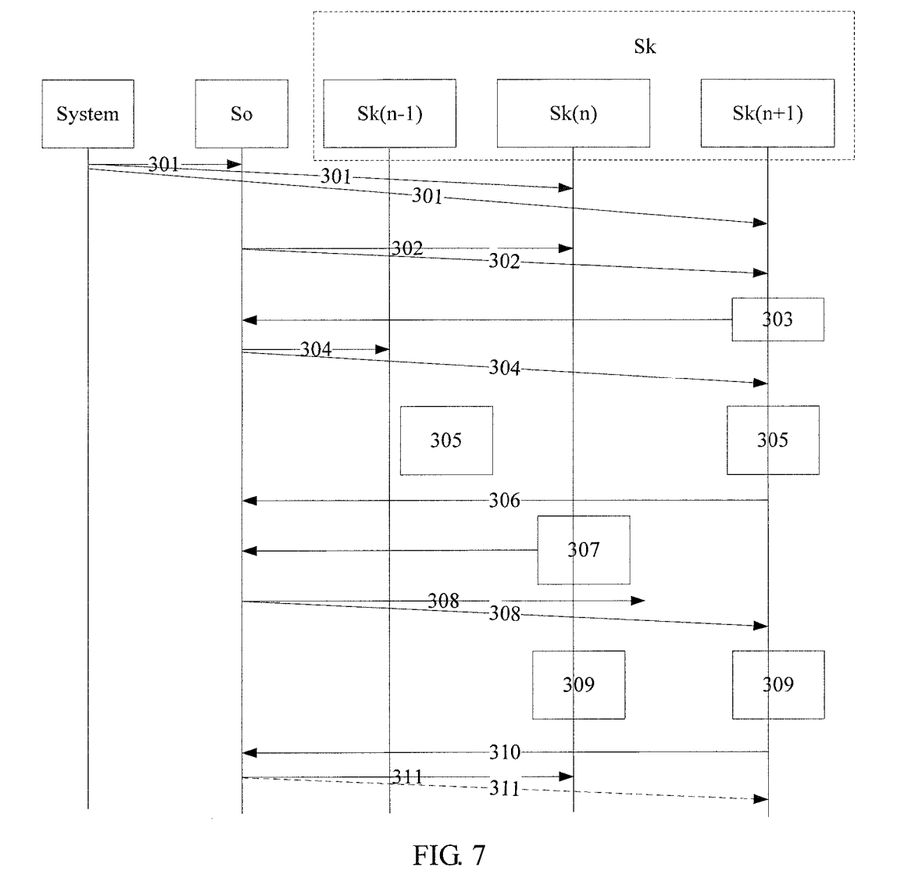
FIG. 7 is a schematic flow chart of a method for increasing bandwidth of an HO OTUflex according to an embodiment of the present invention.

Exemplarily, at this time, the fourth integer, equals the fifth integer, the bandwidth of the customer service data increases, and the bandwidth of the HO OTUbase needs to increase from n OTUbase channels to n+2 OTUbase channels; two orthogonal frequency division multiplexing subcarriers whose modulation format is the same as that of n orthogonal frequency division multiplexing subcarriers are added in each section of a link and they are made available selectively. At the source end and the destination end, two OTUbase channels are added through the LCAS, and the specific process of adding the OTUbase channels, as shown in FIG. 7, includes:

Step 301: A system issues a command to establish an LCAS connection between a source end So and Sk(n) and Sk(n+1) of a destination end Sk.

Step 302: So sends an adding instruction CTRL=ADD to Sk.

Specifically, So finds two CTRL=IDLE idle members (the idle members are two OTUbase channels to be added), changes a CTRL field of the two members to ADD, that is, CTRL=ADD, and sends an adding instruction CTRL=ADD to Sk(n) and Sk(n+1) of the destination end Sk.

Step 303: Sk(n+1) performs a connection check and, if the connection state is normal, returns signaling MST=OK to So.

Specifically, Sk(n+1) performs a connection check and, if the connection state is normal, returns the signaling MST=OK to So where an MST field is used for reporting status of a member and takes either of two values OK or FAIL. MST=OK indicates that the member is problem-free and available and the state of the member is normal; MST=FAIL indicates that the member is unavailable and the state of the member is abnormal.

Step 304: After receiving the signaling MST=OK, So first sends a CTRL=NORM instruction to an original last connection with Sk and then sends a CTRL=EOS instruction to Sk(n+1) of Sk.

Specifically, NORM indicates normal transmission and EOS indicates an end of a sequence and normal transmission. After receiving the signaling MST=OK, So knows that the member state of Sk(n+1) is normal and sends a CTRL=NORM instruction to an original last connection with Sk so that the original last member of Sk changes a CTRL field from EOS to NORM. The CTRL=EOS instruction is sent to Sk(n+1) so that the added connection Sk(n+)) sets a CTRL field to EOS, making the added member Sk(n+1) of Sk become a last member, that is, making the added connection Sk(n+1) become a last connection between So and Sk.

It should be noted that an original last connection between So and Sk refers to a member, among all members of Sk, whose CTRL field is EOS before Sk(n) and Sk(n+1) are added and which is represented by Sk(n−1).

It should be noted that Sk calls each connection established between Sk and So a member.

Step 305: After receiving the CTRL=NORM instruction, the original last connection between Sk and So changes its CTRL field from CTRL=EOS to CTRL=NORM. After receiving the CTRL=EOS instruction, Sk(n+1) of Sk sets its CTRL field to EOS.

Specifically, after receiving the CTRL=NORM instruction, the original last member of Sk changes its CTRL field from CTRL=EOS to CTRL=NORM, making the original last member of Sk turn from an ending member to a normal transmission member. After receiving the CTRL=EOS instruction, the added member Sk(n+1) of Sk sets its CTRL field to EOS, making the added member of Sk become a new ending member.

Step 306: Sk(n+1) of Sk returns So a setting success indication RS=ACK inverted.

Specifically, after successfully setting a CTRL field to EOS, the added member Sk(n+1) of Sk returns So a setting success indication RS=ACK inverted to inform So of a setting success; at this time, an connection Sk(n+1) is added between So and Sk.

Step 307: Sk(n) performs a connection check and, if the connection state is normal, returns the signaling MST=OK to So.

Specifically, same as step 303 and no details are provided herein.

Step 308: After receiving the signaling MST=OK, So first sends the CTRL=NORM instruction to an original last connection with Sk and then sends the CTRL=EOS instruction to Sk(n) of Sk.

Specifically, after receiving the signaling MST=OK, So knows that the member state of Sk(n) is normal and sends the CTRL=NORM instruction to an original last connection with Sk, that is, sends the CTRL=NORM instruction to the member Sk(n+1) of Sk, making an original last member of Sk change a CTRL field from EOS to NORM, that is, making Sk(n+1) change its CTRL field from EOS to NORM. The CTRL=EOS instruction is sent to Sk(n) so that the added connection Sk(n) sets a CTRL field to EOS, making the added member Sk(n) of Sk become a last member, that is, making the added connection Sk(n) become a last connection between So and Sk.

Step 309: After receiving the CTRL=NORM instruction, the original last connection between Sk and So changes its CTRL field from CTRL=EOS to CTRL=NORM. After receiving the CTRL=EOS instruction, Sk(n) of Sk sets its CTRL field to EOS.

Specifically, after receiving the CTRL=NORM instruction, the original last member Sk(n+1) of Sk changes its CTRL field from CTRL=EOS to CTRL=NORM, making the original last member Sk(n+1) of Sk turn from an ending member to a normal transmission member. After receiving the CTRL=EOS instruction, the added member Sk(n) of Sk sets its CTRL field to EOS, making the added member Sk(n) of Sk become a new ending member.

Step 310: Sk(n) of Sk returns So a setting success indication RS=ACK inverted.

Specifically, refer to step 306 and no details are provided herein.

Step 311: So sends a CTRL=SWITCH instruction to at least one of the two newly-established connections Sk(n+1) and Sk(n).

Specifically, So sends the CTRL=SWITCH instruction to at least one of the two newly-established connections Sk(n+1) and Sk(n) to inform Sk that, starting from a next frame, two new members Sk(n+1) and Sk(n) of Sk begin to transmit a service, that is, a switchover is implemented at a next frame of the HO OTUflex for mapping the customer service data to a payload area of the HO OTUflex frame after a change in bandwidth.

It should be noted that, when two members Sk(n+1) and Sk(n) of Sk are added, because Sk(n+1) first returns connection check information, Sk(n+1) is added prior to Sk(n) and the CTRL field of the last member Sk(n) is EOS.

Steps 301 to 310 achieve the increase of bandwidth of an HO OTUbase from n OTUbase channels to n+2 OTUbase channels, and step 311 achieves transmission of customer service data through n+2 OTUbase channels. If the bandwidth of the customer service data increases, hitless bandwidth adjustment may be implemented by using the preceding method to increase bandwidth of an HO OTUflex, thereby achieving flexible adjustment of optical-layer spectrum resources.

It should be noted that the added two OTUbase channels are modulated to the added two orthogonal frequency division multiplexing subcarriers for transport.

If the bandwidth of the customer service data decreases, the fifth integer number of OTUbase channels to be deleted is determined, the LCAS is used to delete the fifth integer number of OTUbase channels to be deleted in the HO OTUflex and the corresponding fourth integer number of optical channel carriers are released.

Specifically, first the fifth integer number of OTUbase channels that need to be deleted at a source end and a destination end are determined, that is, the number of the OTUbase channels to be deleted and their positions are determined. At the source end and the destination end, the LCAS is used to delete the fifth integer number of OTUbase channels to be deleted at the source end and the destination end, and the corresponding fourth integer number of optical channel carriers at the source end and the destination end are released; then another section of a link releases a corresponding optical channel carrier.

Figure 8:
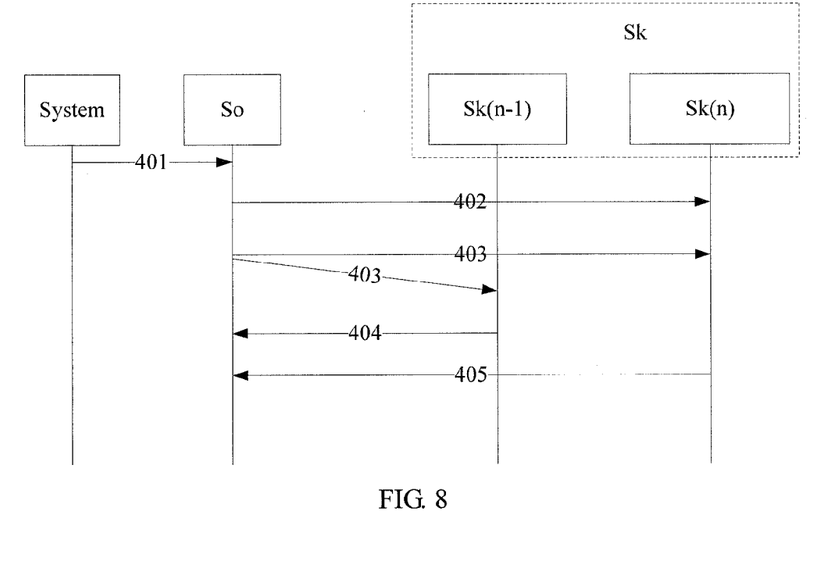
FIG. 8 is a schematic flow chart of a method for decreasing bandwidth of an HO OTUflex according to an embodiment of the present invention.

Exemplarily, at this time, the fourth integer equals the fifth integer, the bandwidth of the customer service data decreases, the bandwidth of the HO OTUbase needs to reduce from n OTUbase channels to n−1 OTUbase channels; first at the source end and the destination end, the LCAS is used to reduce one OTUbase channel and release an orthogonal frequency division multiplexing subcarrier that corresponds to the deleted OTUbase channel between the source end and the destination end, and then another section of the link releases a corresponding orthogonal frequency division multiplexing subcarrier. At the source end and the destination end, a specific process of deleting an OTUbase channel, as shown in FIG. 8, includes:

Step 401: A system issues a command to So for deleting a connection between So and Sk(n) of Sk.

Step 402: So sends a CTR=SWITCH instruction to Sk(n) of Sk.

Specifically, So sends the CTR=SWITCH instruction to Sk(n) that connects Sk and is to be deleted for instructing the member Sk(n) of Sk not to transmit data in a next frame, that is, instructing Sk, in a next frame of the HOT OTUflex, to implement a switchover of mapping the customer service data to a payload area of an HO OTUflex frame after a change in bandwidth Step 403: So sends a CTR=IDLE instruction to Sk(n) of Sk, sets SQ of Sk(n) to a maximum, and sends CTR=EOS to Sk(n−1) of Sk.

Specifically, IDLE indicates that the current member is idle or is to be removed from a group. SQ refers to a sequence number that identifies an Sk member starting from 0. So sends an IDLE instruction to Sk(n) of Sk for removing the member Sk(n) of Sk from the group, that is, deleting Sk(n), and sets SQ of the member Sk(n) of Sk to a maximum. Because Sk(n) is originally a last member of Sk, that is, a CTR field of Sk(n) is EOS, first set a CTR field of Sk(n−1) of Sk to EOS so that Sk(n−1) of Sk sequentially becomes an ending member.

Step 404: Sk(n−1) of Sk returns So a setting success indication RS=ACK inverted.

Specifically, after setting a CTR field to EOS, the member Sk(n−1) of Sk returns So a setting success indication RS=ACK inverted as a confirmation message.

Step 405: Sk(n) of Sk returns So an MST=FAI state, indicating that deletion is successful.

Steps 401 to 405 achieve decrease of the bandwidth of the HO OTUbase from n OTUbase channels to n−1 OTUbase channels. If the bandwidth of the customer service data decreases, hitless bandwidth adjustment may be implemented by using the preceding method to decrease bandwidth of an HO OTUflex, thereby achieving flexible adjustment of optical-layer spectrum resources.

The embodiments of the present invention provide a method for allocating optical spectrum bandwidth resources, where bandwidth of an OTUbase is first obtained according to optical-layer frequency grid bandwidth, then an HO OTUflex whose bandwidth is a first integer multiple of the bandwidth of the OTUbase is constructed according to bandwidth of customer service data and the bandwidth of the OTUbase, the customer service data is mapped to a payload area of the HO OTUflex, related overhead information is encapsulated in the HO OTUflex, and the HO OTUflex is modulated to a second integer number of optical channel carriers for transport. Because the bandwidth of the OTUbase is constructed according to the optical-layer frequency grid bandwidth and therefore fully matches the optical-layer frequency grid bandwidth, and because the HO OTUflex is constructed according to the bandwidth of customer service data and the bandwidth of the OTUbase, a transport bandwidth HO OTU that suits the customer service data and optical spectrum bandwidth resources can be allocated according to the bandwidth of the customer service data, thereby achieving flexible allocation and efficient utilization of optical spectrum resources. By dividing the HO OTUflex that carries the customer service data into the third integer number of individual OTUbase channels, the third integer number of individual OTUbase channels are modulated to the second integer number of optical channel carriers for transmission, thereby achieving transport of the customer service data through time-division multiplexing a plurality of optical channels, which transmits the customer service data more rapidly. When the bandwidth of the customer service data is adjusted, the bandwidth of the HO OTUflex is adjusted accordingly by using the LCAS and an optical channel carrier is adjusted accordingly, thereby achieving hitless bandwidth adjustment.

Figure 9:
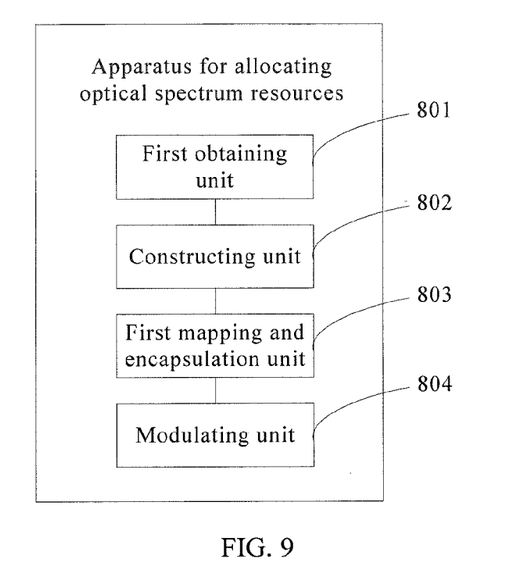
FIG. 9 is a schematic structural diagram of an apparatus for allocating optical spectrum bandwidth resources according to an embodiment of the present invention.
Figure 10:
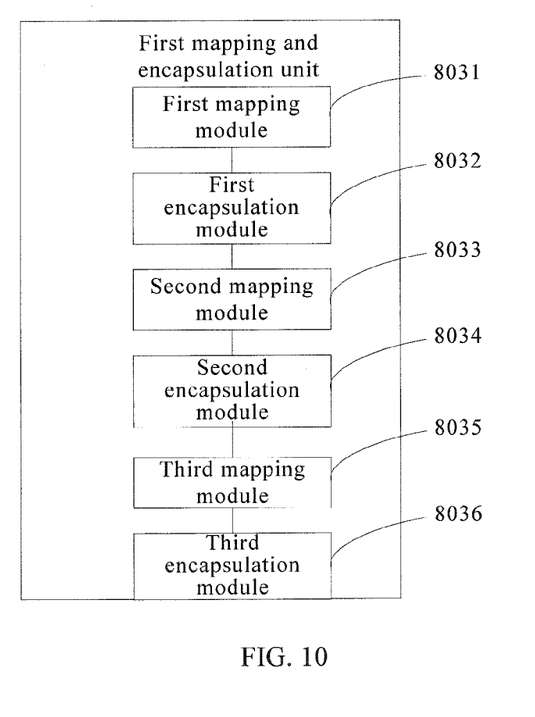
FIG. 10 is a schematic structural diagram of the first mapping and encapsulation unit shown in FIG. 9.
Figure 11:
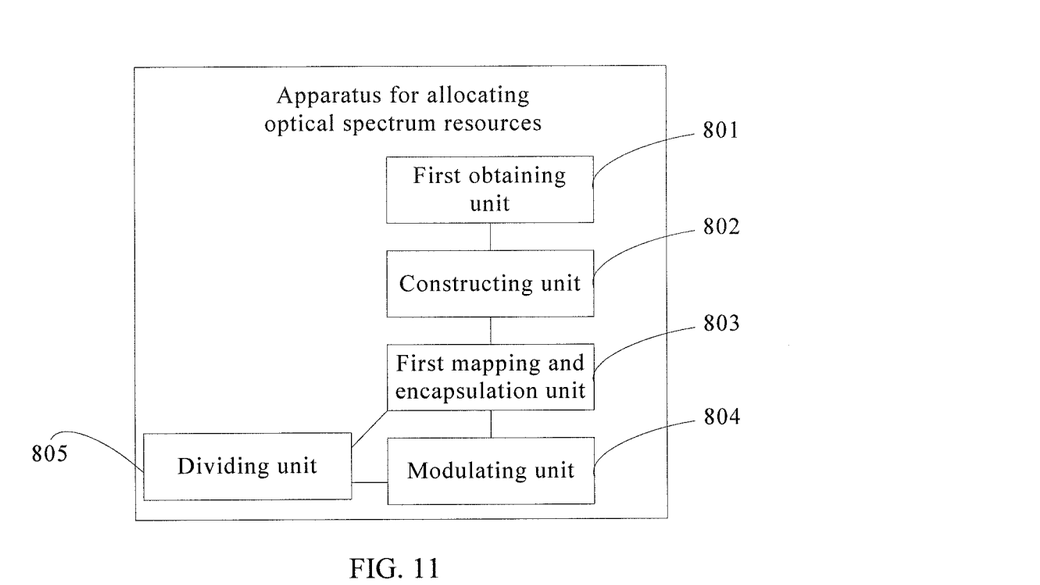
FIG. 11 is a schematic structural diagram of another apparatus for allocating optical spectrum bandwidth resources according to an embodiment of the present invention.

An embodiment of the present invention provides an apparatus for allocating optical spectrum bandwidth resources, as shown in FIG. 9, including:

a first obtaining unit 801, configured to obtain bandwidth of a base optical channel transmission unit OTUbase according to optical-layer frequency grid bandwidth and carrier spectrum efficiency;

Specifically, the first obtaining unit is specifically configured to do the following: calculation by applying a formula: bandwidth of an OTUbase=FG*carrier spectrum efficiency/m, where Frequency Grid (FG) represents optical-layer frequency grid bandwidth whose value may be determined according to a definition of optical frequency grid in International Telecommunications Union ITU-T G.694.1, and m represents a multiple between bandwidth of an OTUbase and a product of the optical-layer frequency grid bandwidth and the carrier spectrum efficiency that is set according to requirements, and m is an integer not less than 1. Optionally, the carried carrier is an orthogonal frequency division multiplexing carrier with a plurality of subcarriers. At this time, the bandwidth of the OTUbase is calculated by applying the formula: bandwidth of an OTUbase=FG*spectrum efficiency of an orthogonal frequency division multiplexing subcarrier/m.

a constructing unit 802, configured to construct a bandwidth-adjustable higher order optical channel transmission unit HO OTUflex according to bandwidth of customer service data and the bandwidth of the OTUbase, where bandwidth of the HO OTUflex is a first integer multiple of the bandwidth of the OTUbase, and the first integer is not less than 1;

a first mapping and encapsulation unit 803, configured to map the customer service data to a payload area of the HO OTUflex and encapsulate overhead information;

Specifically, the first mapping and encapsulation unit 803, as shown in FIG. 10, includes: a first mapping module 8031, a first encapsulation module 8032, a second mapping module 8033, a second encapsulation module 8034, a third mapping module 8035, and a third encapsulation module 8036.

The first mapping module 8031 is configured to directly map, when bandwidth of the customer service data exceeds a threshold, the customer service data to a payload area of a bandwidth-adjustable optical channel payload unit OPUflex.

The first encapsulation module 8032 is configured to encapsulate related overhead information of the OPUflex.

The second mapping module 8033 is configured to map the OPUflex encapsulated by using the first encapsulation module 8032 to a payload area of a corresponding bandwidth-adjustable optical channel data unit ODUflex.

The second encapsulation module 8034 is configured to encapsulate related overhead information of the ODUflex.

The third mapping module 8035 is configured to map the ODUflex encapsulated by using the second encapsulation module 8034 to a payload area of an HO OTUflex.

The third encapsulation module 8036 is configured to encapsulate related overhead information of the HO OTUflex.

a modulating unit 804, configured to modulate the HO OTUflex that carries the customer service data to a second integer number of optical channel carriers, where the second integer is not less than 1.

Figure 12:
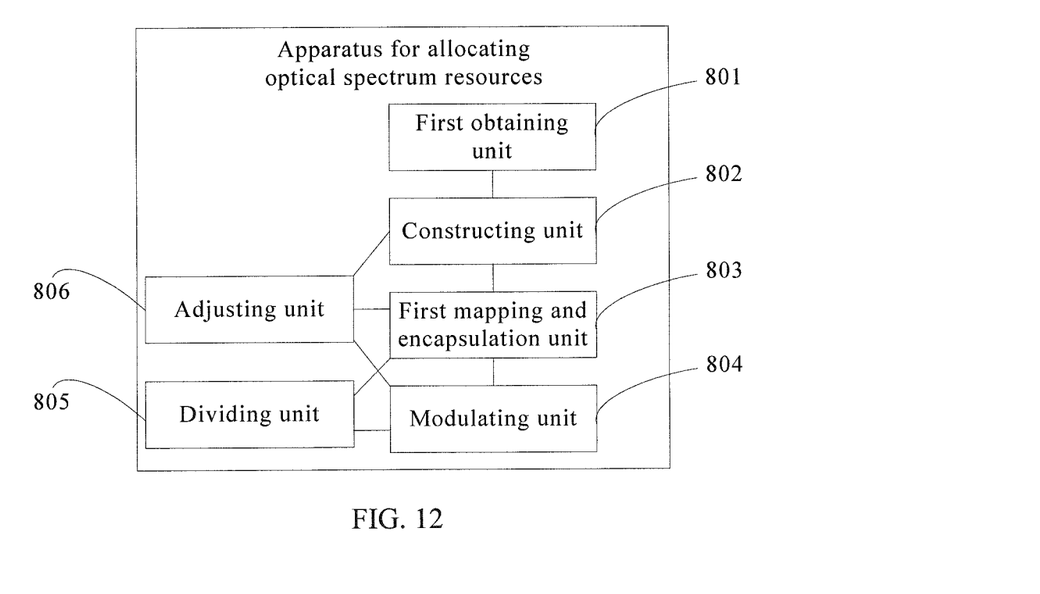
FIG. 12 is a schematic structural diagram of another apparatus for allocating optical spectrum bandwidth resources according to an embodiment of the present invention.

The preceding apparatus, as shown in FIG. 12, includes:

a dividing unit 805, configured to divide the HO OTUflex that carries the customer service data to a third integer number of OTUbase channels, where the third integer is not less than 2.

Preferably, the third integer equals the first integer.

Specifically, depending on different frame formats of an HO OTUflex, the dividing unit 805 uses different methods to divide the HO OTUflex to the third integer number of OTUbase channels.

If a frame format of the HO OTUflex is a concatenation structure of the first integer number of OTUbase frames, the dividing unit 805 is specifically configured to divide the HO OTUflex that carries the customer service data to the third integer number of OTUbase channels by columns.

If a frame format of the HO OTUflex is the same as a frame format of the OTUbase, the dividing unit 805 is specifically configured to divide the HO OTUflex to the third integer number of OTUbase channels by byte granularities.

Alternatively, the dividing unit 805 is specifically configured to distribute the HO OTUflex to the third integer number of OTUbase channels by frame granularities.

The modulating unit 804 is specifically configured to multiplex and modulate the third integer number of OTUbase channels to the second integer number of optical channel carriers, where the second integer is not less than 1 and the third integer is a multiple of the second integer. Preferably, the third integer equals the second integer.

The preceding apparatus, as shown in FIG. 12, further includes:

an adjusting unit 806, configured to: when bandwidth of the customer service data is adjusted, adjust the bandwidth of the HO OTUflex according to the bandwidth of the customer service data and by using a link capacity adjustment scheme LCAS, and adjust an optical channel carrier accordingly.

A control field of the LCAS includes a setting instruction; the setting instruction is used for instructing a destination end, in a next frame of the HO OTUflex, to implement a switchover of mapping the customer service data to a payload area of an HO OTUflex after a change in bandwidth.

The adjusting unit 806 is specifically configured to: if the bandwidth of the customer service data increases, add a fourth integer number of optical channel carriers in each section of a link and use the LCAS to add a fifth integer number of OTUbase channels, add the fifth integer number of OTUbase channels to the HO OTUflex, and modulate the added fifth integer number of OTUbase channels to the added fourth integer number of optical channel carriers, where the fourth integer is not less than 1, the fifth integer is not less than 1, and the fifth integer is an integral multiple of the fourth integer; and if the bandwidth of the customer service data decreases, determine the fifth integer number of OTUbase channels to be deleted, use the LCAS to delete the fifth integer number of OTUbase channels to be deleted in the HO OTUflex and release the corresponding fourth integer number of optical channel carriers. Preferably, the fourth integer equals the fifth integer.

The embodiments of the present invention provide an apparatus for allocating optical spectrum bandwidth resources, where bandwidth of an OTUbase is first obtained according to optical-layer frequency grid bandwidth, then an HO OTUflex whose bandwidth is a first integer multiple of the bandwidth of the OTUbase is constructed according to bandwidth of customer service data and the bandwidth of the OTUbase, the customer service data is mapped to a payload area of the HO OTUflex, related overhead information is encapsulated in the HO OTUflex, and the HO OTUflex is modulated to an optical channel carrier for transport. Because the bandwidth of the OTUbase is constructed according to the optical-layer frequency grid bandwidth and therefore fully matches the optical-layer frequency grid bandwidth, and because the HO OTUflex is constructed according to the bandwidth of customer service data and the bandwidth of the OTUbase, a transport bandwidth HO OTU that suits the customer service data and optical spectrum bandwidth resources can be allocated according to the bandwidth of the customer service data, thereby achieving flexible allocation and efficient utilization of optical spectrum resources. By dividing the HO OTUflex that carries the customer service data into the third integer number of individual OTUbase channels, the third integer number of individual OTUbase channels are modulated to the second integer number of optical channel carriers for transmission, thereby achieving transport of the customer service data through time-division multiplexing a plurality of optical channels, which transmits the customer service data more rapidly. When the bandwidth of the customer service data is adjusted, the bandwidth of the HO OTUflex is adjusted accordingly by using the LCAS and an optical channel carrier is adjusted accordingly, thereby achieving hitless bandwidth adjustment.

The foregoing descriptions are merely specific embodiments of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method for allocating optical spectrum bandwidth resources, comprising:
   determining, by a processor of an apparatus for allocating the optical spectrum bandwidth resources, a bandwidth of a base optical channel transmission unit (OTUbase) according to an optical-layer frequency grid bandwidth and a carrier spectrum efficiency;
   constructing, by the processor, a bandwidth-adjustable higher order optical channel transmission unit (HO OTUflex) according to a bandwidth of customer service data and the bandwidth of the OTUbase, wherein the bandwidth of the HO OTUflex is a first integer multiple of the bandwidth of the OTUbase;
   mapping, by the processor, the customer service data to a payload area of the HO OTUflex and encapsulating overhead information; and
   modulating the HO OTUflex that carries the customer service data to a second integer number of optical channel carriers, by implementing the following:
      dividing the HO OTUflex that carries the customer service data into a third integer number of OTUbase channels wherein the third integer is greater than or equal to 2; and
      multiplexing and modulating the third integer number of OTUbase channels to the second integer number of optical channel carriers, wherein the second integer is greater than or equal to 1 and the third integer is a multiple of the second integer.

2. The method according to claim 1, wherein the determining the bandwidth of the OTUbase comprises:
   obtaining the bandwidth of the OTUbase according to a formula:
   bandwidth of an OTUbase=FG*carrier spectrum efficiency/m, wherein FG represents optical-layer frequency grid bandwidth, and m is an integer greater than or equal to 1.

3. The method according to claim 1, wherein the of the third integer equals to the first integer.

4. The method according to claim 3, wherein a frame format of the HO OTUflex is a concatenation structure of the first integer number of OTUbase frames; and
   wherein dividing the HO OTUflex that carries the customer service data into a third integer number of OTUbase channels comprises:
   dividing the HO OTUflex that carries the customer service data into the third integer number of OTUbase channels by columns.

5. The method according to claim 1, wherein,
   a frame format of the HO OTUflex is the same as a frame format of the OTUbase; and
   wherein dividing the HO OTUflex that carries the customer service data comprises:
   dividing the HO OTUflex into the third integer number of OTUbase channels by byte granularities.

6. The method according to claim 1, further comprising:
   when the bandwidth of the customer service data is adjusted, adjusting, by the processor, the bandwidth of the HO OTUflex according to the bandwidth of the customer service data and using a link capacity adjustment scheme LCAS, and accordingly adjusting an optical channel carrier, wherein, a control field of the LCAS comprises a setting instruction which instructs a destination end, in a next frame of the HO OTUflex, to implement a switchover of mapping the customer service data to a payload area of the HO OTUflex after a change in bandwidth.

7. The method according to claim 6, wherein adjusting the bandwidth of the HO OTUflex, when the bandwidth of the customer service data is adjusted, and accordingly adjusting the optical channel carrier further comprises:
   when the bandwidth of the customer service data increases, adding a fourth integer number of optical channel carriers in each section of a link and using the LCAS to add a fifth integer number of OTUbase channels, adding the fifth integer number of OTUbase channels to the HO OTUflex, and modulating the added fifth integer number of OTUbase channels to the added fourth integer number of optical channel carriers, wherein, the fourth integer is greater than or equal to 1, the fifth integer is greater than or equal to 1, and the fifth integer is an integral multiple of the fourth integer; and
   when the bandwidth of the customer service data decreases, determining the fifth integer number of OTUbase channels to be deleted, using the LCAS to delete the fifth integer number of OTUbase channels to be deleted in the HO OTUflex and releasing the corresponding fourth integer number of optical channel carriers.

8. An apparatus for allocating optical spectrum bandwidth resources, comprising:
   a processor and a non-transitory computer readable medium having a plurality of computer executable instructions stored thereon which, when executed by the processor, cause the processor to:
   determine a bandwidth of a base optical channel transmission unit (OTUbase) according to an optical-layer frequency grid bandwidth and a carrier spectrum efficiency; construct a bandwidth-adjustable higher order optical channel transmission unit (HO OTUflex) according to a bandwidth of customer service data and the bandwidth of the OTUbase, wherein the bandwidth of the HO OTUflex is a first integer multiple of the bandwidth of the OTUbase; and map the customer service data to a payload area of the HO OTUflex and encapsulate overhead information; and
   a modulator configured to modulate the HO OTUflex that carries the customer service data to a second integer number of optical channel carrier;
   the processor is further caused to: divide the HO OTUflex that carries the customer service data into a third integer number of OTUbase channels wherein the third integer is greater than or equal to 2;
   the modulator is configured to multiplex and modulate the third integer number of OTUbase channels to the second integer number of optical channel carriers, wherein the second integer is greater than or equal to 1 and the third integer is a multiple of the second integer.

9. The apparatus according to claim 8, wherein the processor is further caused to: obtain the bandwidth of the OTUbase according to a following formula: bandwidth of an OTUbase=FG*carrier spectrum efficiency/m, wherein, FG represents optical-layer frequency grid bandwidth, and m is a set integer greater than or equal to 1.

10. The apparatus according to claim 8, wherein a frame format of the HO OTUflex is a concatenation structure of a first integer number of OTUbase frames;
the processor is further caused to divide the HO OTUflex that carries the customer service data into a third integer number of OTUbase channels by columns.

11. The apparatus according to claim 8, wherein a frame format of the HO OTUflex is the same as a frame format of the OTUbase;
the processor is further caused to divide the HO OTUflex into the third integer number of OTUbase channels by byte granularities.

12. The apparatus according to claim 8, wherein:
the processor is further caused to: when the bandwidth of the customer service data is adjusted, adjust bandwidth of the HO OTUflex according to the bandwidth of the customer service data and using a link capacity adjustment scheme LCAS, and accordingly adjust an optical channel carrier, wherein, a control field of the LCAS comprises a setting instruction which instructs a destination end, in a next frame of the HO OTUflex, to implement a switchover of mapping the customer service data to a payload area of the HO OTUflex after a change in bandwidth.

13. The apparatus according to claim 12, wherein the processor is further caused to: when the bandwidth of the customer service data increases, add a fourth integer number of optical channel carriers in each section of a link and use the LCAS to add a fifth integer number of OTUbase channels, add the fifth integer number of OTUbase channels to the HO OTUflex, and modulate the added fifth integer number of OTUbase channels to the added fourth integer number of optical channel carriers, wherein, the fourth integer is greater than or equal to 1, the fifth integer is greater than or equal to 1, and the fifth integer is an integral multiple of the fourth integer;
when the bandwidth of the customer service data decreases, determine the fifth integer number of OTUbase channels to be deleted, use the LCAS to delete the fifth integer number of OTUbase channels to be deleted in the HO OTUflex and release the corresponding fourth integer number of optical channel carriers are released.

14. The method according to claim 1, wherein, a frame format of the HO OTUflex is the same as a frame format of the OTUbase; and wherein dividing the HO OTUflex that carries the customer service data comprises: distributing the HO OTUflex to the third integer number of OTUbase channels by frame granularities.

15. The apparatus according to claim 8, wherein a frame format of the HO OTUflex is the same as a frame format of the OTUbase; the processor is further caused to distribute the HO OTUflex to the third integer number of OTUbase channels by frame granularities.

* * * * *